3,174,868
PROCESS FOR THE PRODUCTION OF
EDIBLE FATS
Barton F. Teasdale, Islington, Ontario, and George A. Helmel, Rexdale, Ontario, Canada, assignors to Canada Packers Limited, Toronto, Ontario, Canada
No Drawing. Filed Nov. 29, 1961, Ser. No. 155,857
6 Claims. (Cl. 99—118)

This invention relates to the production of a new series of edible fats from palm kernel oil. These fats are of the type commonly known as "hard butters" and are particularly useful in making coatings for biscuits, candy bars, and other confections.

The qualities sought after in coatings made with hard butter or with cocoa butter are (1) the ability to break sharply and suddenly, i.e., the quality known to the trade as "snap," (2) glossy appearance, i.e., the quality known as "gloss retention," and (3) the ability to melt rapidly in the mouth, i.e., the quality known as "melt-in-mouth." Since fat is the continuous matrix of confectionery coatings, it is the ingredient which influences these qualities to the greatest extent.

Snap is primarily a function of the amount of solid fat present at the temperature at which the confection is being eaten. The higher the proportion of the fat which is solid, the drier and more brittle the coating is, that is, the better its snap. This dryness is important for palatability since the consumer does not like to handle or eat a soft, sticky, coated biscuit or bar. The Solids Content Index (hereinafter sometimes referred to as SCI) of the fat is a good indication of the snap of the coating.

The coated confections must have an attractive appearance when purchased. For this reason, manufacturers take a great deal of care to be sure that the coating has a good gloss when it is produced, and it is important that this gloss be retained until the confection is ready to be eaten. Unfortunately, many products tend to lose their gloss during storage. The loss of gloss is most often due to the onset of "fat bloom," which in a more severe form may even give a greyish-white appearance to the confection. The "fat bloom" is a recrystallization of the fat from the very fine crystals present when the gloss is good, to the larger, coarser crystals of the "fat bloom." This recrystallization may take place at ordinary temperatures when a lower melting, unstable polymorph recrystallizes into a higher melting form, or may be caused by an overheating of the confection and a subsequent recooling. Cocoa butter is particularly prone to "fat bloom" because of a strong tendency toward crystallizing in unstable forms and because of its low melting point.

It has been considered important that the coating melts rapidly in the mouth so that it will not give a waxy sensation when eaten. However, it is not necessary for the fat to be completely molten at body temperatures. Fats with Wiley melting points above body temperature may still have a good or satisfactory melt-in-mouth quality, depending upon Solids Content Index and other factors. The fats produced by the process of the present invention have a desirable combination of properties providing satisfactory melt-in-mouth qualities over a relatively wide range of melting points extending above and below body temperature.

Accordingly, it is an object of the present invention to provide a novel method for producing new "hard butters" which possess desirable snap, gloss retention and melt-in-mouth properties.

Another object of the invention is to provide hard butter products which have a relatively high solid fat content at temperatures encountered up to the time the products are eaten but which have satisfactory melt-in-mouth characteristics.

Cocoa butter is often used for the chocolate coatings in the winter. However, because of its low melting point it is preferable to use other edible fats of the "hard-butter" type for these coatings in the summer time. In the non-chocolate "novelty coatings," cocoa butter cannot be used because of its brown color and here "hard butters" are necessary. They are usually made by the fractional crystallization, either with or without the use of solvent, of palm kernel oil or coconut oil, either hydrogenated or nonhydrogenated. They can be "tailored" as by adjustment of processing conditions and by blending different starting materials, to provide products of different melting points for various application. This fractional crystallization is a costly process. Special equipment including tanks, temperature controls, filter presses, solvent recovery systems, etc., are required. The portion of the original oil that is left over after the preferred fraction is removed is usually less valuable and must be disposed of at a lower price.

Other processes have utilized special rearrangement procedures on hydrogenated or unhydrogenated oils or blends. Such processes require very careful control to provide satisfactory products.

Accordingly, another object of the invention is to provide a method whereby an entire series of "tailor-made" hard butters may be produced by a relatively simple and economical operation involving a single starting material and a minimum number of processing steps.

It has been discovered that a whole range of hard butters can be produced without having to resort to the crystallization procedure.

The process of the invention comprises the hydrogenation of palm kernel oil to an iodine value of less than 3, followed by the complete random rearrangement of a portion of the hydrogenated material and the blending of selected portions of the rearranged hydrogenated material with the hydrogenated but unrearranged portion.

For some purposes, hydrogenated palm kernel oil can be used as it is as a hard butter, but for most applications its melting point is too high, i.e., it does not possess satisfactory "melt-in-mouth" properties. When this hydrogenated palm kernel oil is subjected to random rearrangement, that is, the fatty acids are arranged into triglycerides in a random way, the melting point is lowered substantially, from about 46° C. to about 35° C. The rearranged hydrogenated palm kernel oil could be used as a low melting hard butter, but it is generally too soft for most purposes.

It has been found that by blending the two ingredients—hydrogenated palm kernel oil and rearranged hydrogenated palm kernel oil—in selected proportions, a whole series of excellent hard butters is obtained. The two materials blend readily in all proportions and the process is thereby very flexible, giving hard butters of all desired melting points within the 35° to 45° C. range. All of these have excellent snap, gloss-retention and melt-in-mouth properties. The blending of the hydrogenated portion with the randomly rearranged, hydrogenated, low melting portion does not produce a waxiness in the mouth as might be expected from experience in blending hard stock in other low melting fats. Satisfactory melt-in-mouth properties are obtained even though the particular blend is not completely molten at body temperature. It will be understood, however, that the higher the proportion of low melting material, the better is the melt-in-mouth property.

The palm kernel oil may be hydrogenated or "hardened" by any of the conventional methods for solidifying fatty oils. Generally, in the present process, the base oil is hardened to an iodine value of less than 3 and may be advantageously hardened to an I.V. of less than 1.

The random rearrangement of the hydrogenated palm kernel oil is carried out under conventional conditions for interesterification so as to cause a substantially complete randomization of the fatty radicals. Suitable catalysts for this process are the alkali metal alkoxides, such as sodium methoxide. Small amounts of the catalyst are used, e.g., between about 0.1% and 0.5% by weight of the oil. In brief, the rearrangement step comprises treating the hydrogenated oil with the catalyst under anhydrous conditions whereby the fatty acids are completely redistributed among the glycerol molecules entirely at random. After the interesterification is complete the product is worked up in known fashion. Thus, the catalyst may be neutralized, the triglycerides bleached with activated bleaching earth and the methyl esters removed as by steam distillation.

The rearrangement brings about a considerable change in the physical properties of the fat. Two directly measurable criteria clearly exemplify these new physical properties, namely, Wiley melting point and Solids Content Index. The Wiley melting point of the hydrogenated oil after interesterification is lowered at least about 10° C. This temperature differential occurs over a critical range for coating fats. Palm kernel oil hydrogenated to I.V. 3 or lower has a Wiley melting point of about 44°–49° C., depending on the source of the oil. These temperatures are about the maximum for hard butters. The rearranged hydrogenated oil has a melting point of about 35° C., which is near the minimum temperature for useful hard butters. The blended products of the present invention preferably have a Wiley melting point range of from about 35° to 46° C.

The SCI of a coating fat throughout the usual range of temperatures encountered during storing, marketing and eating, gives a good indication of the properties of the product. The SCI of the hydrogenated fats is lowered by the random rearrangement procedure, and while undesirably low for most coating purposes, is, quite unexpectedly, ideally suited for blending with a portion of the original hydrogenated material to provide a product of very satisfactory SCI throughout the normally encountered temperature range. Satisfactory blends are obtained in accordance with the present invention when the SCI at 30° C. is above about 25 and at 35° C. is below about 15. Such products have the desired snap and also exhibit good melt-in-mouth properties. Gloss retention is excellent.

By properly blending one portion of the hydrogenated palm kernel oil with another portion which has been randomly rearranged to provide Wiley melting points and SCI within the ranges given above, all three of the desired qualities for edible coating fats may be obtained. In fact, a blend can be selected to produce a coating tailor-made for its intended use. Higher melting and higher SCI products may be provided for hot climates or summertime use, and relatively low melting and low SCI products provided for colder climates or wintertime use. Solids Content Indices and melting points can be adjusted for the type of confection or coating produced.

The following examples are set forth as illustrative of but not as limiting the present invention:

Example 1

1,000 grams of palm kernel oil were hydrogenated to an I.V. of less than 3. The fatty acid composition as determined by gas-liquid chromatography was as follows:

| | |
|---|---|
| $C^6$ ___percent__ | 0.8 |
| $C^8$ ___do____ | 0.6 |
| $C^{10}$ ___do____ | 5.2 |
| $C^{12}$ ___do____ | 46.4 |
| $C^{14}$ ___do____ | 19.5 |
| $C^{16}$ ___do____ | 8.5 |
| $C^{18}$ ___do____ | 19.0 |
| Wiley melting point ___° C.__ | 46.8 |

Solids Content Index, ° C.:

| | |
|---|---|
| 10 | 74.2 |
| 15 | 72.7 |
| 20 | 67.0 |
| 25 | 53.0 |
| 30 | 31.3 |
| 35 | 15.4 |
| 38 | 11.7 |

Five hundred grams of this hydrogenated palm kernel oil were interesterified to random by heating at 240° F. with 0.5% of sodium methoxide for 20 minutes. The catalyst was neutralized with phosphoric acid, and the triglycerides were bleached with activated bleaching earth, and the methyl esters removed by steam distillation. The interesterified fat had the following constants.

| | |
|---|---|
| Wiley melting point ___° C.___ | 35.0 |

Solids Content Index, ° C.:

| | |
|---|---|
| 10 | 65.0 |
| 15 | 59.3 |
| 20 | 49.9 |
| 25 | 32.9 |
| 30 | 15.5 |
| 35 | 1.4 |
| 38 | 1.1 |

The following blends were formulated and the Wiley melting points and Solids Content Indices determined.

| | Wiley M.P., ° C. | Solids Content Index, ° C. | | | | | | |
|---|---|---|---|---|---|---|---|---|
| | | 10 | 15 | 20 | 25 | 30 | 35 | 38 |
| 1. Hydro'd 50%, Int. Hydro'd. 50% | 41.7 | 70.0 | 66.5 | 57.4 | 42.0 | 25.6 | 8.7 | 5.2 |
| 2. Hydro'd 65%, Int. Hydro'd. 35% | 44.2 | 71.0 | 68.0 | 59.7 | 44.2 | 27.7 | 10.2 | 6.7 |
| 3. Hydro'd 80%, Int. Hydro'd. 20% | 46.0 | 72.4 | 69.9 | 62.6 | 47.4 | 29.0 | 12.4 | 8.5 |

These three blends were used as the fat base for coating preparations using the following recipe:

170 parts by weight of coating fat
215 parts by weight of icing sugar
70 parts by weight of cocoa powder All were found to have good "snap" at room temperature and to have good "gloss" retention. Number (1) had the best eating qualities, as expected from the lowest melting point and would be preferred for most operations. Where higher than average temperatures would be encountered numbers (2) and (3) would be preferred.

Example 2

800 pounds of palm kernel oil from a different source than that of Example One were hydrogenated to an I.V. of 1.0 in two 400 pound lots.

The fatty acid composition of the 800 pounds was:

| | Percent |
|---|---|
| $C^8$ | 4.6 |
| $C^{10}$ | 3.0 |
| $C^{12}$ | 51.8 |
| $C^{14}$ | 14.7 |
| $C^{16}$ | 8.6 |
| $C^{18}$ | 17.3 |

400 pounds of this hydrogenated palm kernel oil were interesterified to random. Laboratory blends of the two were made and the Wiley melting points determined.

| | 1 | 2 | 3 |
|---|---|---|---|
| Interesterified Hydro'd Palm Kernel Oil, percent | 50 | 60 | 65 |
| Hydrogenated Palm Kernel Oil, percent | 50 | 40 | 35 |
| Wiley M. P., °C | 40.6 | 39.8 | 39.2 |

500 pounds of (2) were formulated and the following Solids Content Indices found:

| | Percent |
|---|---|
| 10° C. | 71.0 |
| 15° C. | 68.3 |
| 20° C. | 62.1 |
| 25° C. | 49.4 |
| 30° C. | 32.3 |
| 35° C. | 10.2 |
| 38° C. | 5.8 |

As for Example 1, a sample of the blend was made into a chocolate type coating. It was found to have a good snap, good gloss retention and good melt-in-mouth.

*Example 3*

800 pounds of palm kernel oil were hydrogenated to an I.V. of 0.5.

500 pounds of this hydogenated palm kernel oil were rearranged to random as in Example 1.

| | °C. |
|---|---|
| Hydrogenated palm kernel oil, Wiley M. P. | 48.2 |
| Rearranged hydrogenated palm kernel oil, Wiley M.P. | 35.5 |

The following blends were formulated and the Wiley melting points and Solids Content Indices determined:

| | 1 | 2 |
|---|---|---|
| Interesterified Hydrogenated, percent | 64 | 60 |
| Hydrogenated, percent | 35 | 40 |
| Wiley M. P., ° C | 40.8 | 42.4 |
| Solids Content Index, ° C.: | | |
| 10 | 71.5 | 72.2 |
| 21.1 | 59.8 | |
| 26.7 | 43.0 | 43.5 |
| 33.3 | 16.0 | |
| 40 | 2.1 | 2.8 |

425 pounds of #1 were formulated. Again a sample of coating was made up using the standard recipe and tested in the laboratory. It was found to have good snap and set, good mouth qualities and very good gloss retention.

*Example 4*

Approximately 20,000 pounds of another shipment of palm kernel oil were hydrogenated to an I.V. of 0.7. The fatty acid composition of this hydrogenated fat was as follows:

| | Percent |
|---|---|
| $C^6$ | 0.1 |
| $C^8$ | 3.0 |
| $C^{10}$ | 3.3 |
| $C^{12}$ | 47.4 |
| $C^{14}$ | 16.6 |
| $C^{16}$ | 9.0 |
| $C^{18}$ | 20.6 |

Approximately 10,000 pounds of this hydrogenated palm kernel oil were interesterified to random by heating at 240° F. with 0.5% of sodium methoxide as catalyst. After about 20 minutes' agitation the catalyst was neutralized with phosphoric acid, the fat bleached with activated bleaching earth and the methyl esters removed by steam distillation.

The following samples were prepared using the two portions so prepared. The Wiley melting points and Solids Content Indices at the various temperatures of the samples are given below:

| Hydrogenated Palm Kernel, percent | 100 | 85 | 70 | 50 | 30 | 15 | |
|---|---|---|---|---|---|---|---|
| Interesterified Hydrogenated Palm Kernel, percent | | 15 | 30 | 50 | 70 | 85 | 100 |
| Wiley Melting Point, ° C. | 44.7 | 43.6 | 42.4 | 40.7 | 38.8 | 37.0 | 35.2 |
| Solids Content Index, °C: | | | | | | | |
| 10 | 73.7 | 73.3 | 72.1 | 70.9 | 69.9 | 69.2 | 68.9 |
| 15 | 71.1 | 70.7 | 69.7 | 68.9 | 66.7 | 65.8 | 65.3 |
| 20 | 65.1 | 64.3 | 63.3 | 61.5 | 59.9 | 58.8 | 58.0 |
| 25 | 52.1 | 50.1 | 50.1 | 48.1 | 47.4 | 46.4 | 46.0 |
| 30 | 32.7 | 34.0 | 33.7 | 32.6 | 31.5 | 29.7 | 29.3 |
| 35 | 16.0 | 13.5 | 12.5 | 10.3 | 8.4 | 7.8 | 6.8 |
| 38 | 11.5 | 8.8 | 7.5 | 5.1 | 2.6 | 1.5 | 0.7 |

A portion of each blend was made into a chocolate type coating using the same recipe as in the previous examples. All were found to have good snap and good gloss retention. The melt-in-mouth quality showed some variation, with blends containing above about 50% hydrogenated oil giving satisfactory mouth qualities and those below about 50% hydrogenated oil giving excellent mouth qualities. It will be understood, however, that there is no sharp dividing line at the 50% level.

All of the percentages given in the foregoing examples are percent-by-weight. The method for determining the "Solids Content Index" of the products described herein is similar to Method Cd 10-57 of the American Oil Chemists' Society.

It will be understood that the Wiley melting point and the Solids Content Index will vary to some extent in accordance with the source of the oil and the degree of "hardness" of the oil as indicated by its iodine value. The proportions of hydrogenated oil to hydrogenated-interesterified oil will therefore be subject to some adjustment for different batches. Further, the degree of hydrogenation may be selected to provide products of slightly different characteristics but having melting points and solids contents within the ranges specified.

Many obvious modifications will occur to those skilled in the art and may be made in the present process and product without departing from the spirit of the invention claimed as follows:

We claim:

1. A process for the production of edible coating fats comprising, hydrogenating palm kernel oil to an iodine value of less than 3, dividing the hydrogenated oil into first and second portions, interesterifying the first portion of the hydrogenated oil to randomly rearrange the fatty radicals of said oil, and blending said interesterified oil with said hydrogenated oil in proportions of about 15 to 85% by weight of interesterified hydrogenated oil, based on the weight of the blended product, to provide a coating fat which has a Wiley melting point from 35° to 46° C.

2. The process according to claim 1 in which the blend contains no more than about 50% of hydrogenated non-interesterified palm kernel oil.

3. A process according to claim 1 in which said oil is hydrogenated to an iodine value of less than 1.

4. A process according to claim 1 in which the step of interesterifying is conducted by heating said hydrogenated oil to a temperature of about 240° F. in the presence of a metal alkoxide catalyst.

5. A process according to claim 4 in which the catalyst is sodium methoxide.

6. A process for the production of edible coating fats comprising, blending a hydrogenated, non-interesterified palm kernel oil having an iodine value of less than 3 with a hydrogenated palm kernel oil having an iodine value of less than 3 in which the fatty radicals have been randomly rearranged by interesterification, the proportions of hydrogenated non-interesterified oil and interesterified hydrogenated oil being selected to provide a blended product having a Wiley melting point from 35° to 46° C. and a Solids Content Index of at least 25 at 30° C. and of less than 15 at 35° C.

References Cited in the file of this patent

UNITED STATES PATENTS

| | | |
|---|---|---|
| 2,442,536 | Eckey | June 1, 1948 |
| 2,726,158 | Cochrane et al. | Dec. 6, 1955 |

FOREIGN PATENTS

| | | |
|---|---|---|
| 816,514 | Great Britain | July 15, 1959 |